(12) United States Patent
Garthaffner et al.

(10) Patent No.: US 11,851,285 B2
(45) Date of Patent: Dec. 26, 2023

(54) BEAD FEEDER

(71) Applicant: Philip Morris USA Inc., Richmond, VA (US)

(72) Inventors: Martin T. Garthaffner, Richmond, VA (US); Dwight D. Williams, Powhatan, VA (US)

(73) Assignee: Philip Morris USA Inc., Richmond, VA (US)

( * ) Notice: Subject to any disclaimer, the term of this patent is extended or adjusted under 35 U.S.C. 154(b) by 346 days.

(21) Appl. No.: 16/750,511

(22) Filed: Jan. 23, 2020

(65) Prior Publication Data

US 2020/0156883 A1 May 21, 2020

Related U.S. Application Data

(63) Continuation of application No. 13/777,749, filed on Feb. 26, 2013, now Pat. No. 10,569,969.

(51) Int. Cl.
*B65G 47/14* (2006.01)
*A24D 3/02* (2006.01)
*B65G 47/84* (2006.01)

(52) U.S. Cl.
CPC ....... *B65G 47/1428* (2013.01); *A24D 3/0216* (2013.01); *B65G 47/848* (2013.01)

(58) Field of Classification Search
CPC .............. B65G 47/1407; B65G 47/848; B65G 47/1428; A24D 3/0216
USPC ...................................... 493/47; 221/1, 265
See application file for complete search history.

(56) References Cited

U.S. PATENT DOCUMENTS

| | | |
|---|---|---|
| 611,302 A | 9/1898 | Weiss |
| 3,064,406 A | 11/1962 | Kennedy et al. |
| 3,817,423 A | 6/1974 | McKnight |
| 3,986,636 A | 10/1976 | Hoppmann et al. |
| 4,144,970 A | 3/1979 | McKnight et al. |
| 5,826,696 A | 10/1998 | Rupp et al. |
| 5,865,342 A | 2/1999 | Ito et al. |
| 7,510,099 B2 | 3/2009 | Knoth et al. |

(Continued)

*Primary Examiner* — Robert F Long
*Assistant Examiner* — Xavier A Madison
(74) *Attorney, Agent, or Firm* — Harness, Dickey & Pierce, P.L.C.

(57) ABSTRACT

A bead feeder serially delivering beads to a downstream location comprises a bead supply wheel connected to rotate about a vertical axis. The bead supply wheel includes a bead supply bowl and a plurality of radially and outwardly extending bead passageway connected to rotate with the bowl and dimensioned to receive a single line of beads. A plurality of openings in the bead supply bowl is spaced around a lower portion thereof with the openings in alignment with the radially and outwardly extending passageways each of which has an outer exit end. A metering plate is connected to rotate about the same vertical axis as the bead supply wheel, and metering plate has a plurality of equally spaced apart openings directly below the outer ends of the passageways for receiving the lowermost beads in the passageways. The metering plate rotates at a slightly slower or slightly faster speed than the bead supply wheel so that vertical alignment of an outer exit end of a particular passageway and an opening in the metering plate only occurs once for each revolution of the bead supply wheel. A drop off is provided for the removal of beads away from the metering plate.

20 Claims, 2 Drawing Sheets

(56) References Cited

U.S. PATENT DOCUMENTS

| | | |
|---|---|---|
| 8,381,947 B2 | 2/2013 | Garthaffner et al. |
| 9,004,261 B2 | 4/2015 | Cielikowski et al. |
| 9,049,887 B2 | 6/2015 | Ercelebi et al. |
| 9,089,163 B2 | 7/2015 | Le Roux |
| 2004/0020554 A1 | 2/2004 | Smith et al. |
| 2004/0050311 A1 | 3/2004 | Mariman et al. |
| 2005/0070409 A1 | 3/2005 | Deal |
| 2009/0145724 A1 | 6/2009 | Garthaffner et al. |
| 2009/0166376 A1* | 7/2009 | Garthaffner .......... B65G 47/846 221/282 |
| 2011/0053745 A1 | 3/2011 | Iliev et al. |

* cited by examiner

BEAD FEEDER

CROSS-REFERENCE TO RELATED APPLICATIONS

This is a continuation of U.S. application Ser. No. 13/777,749, filed Feb. 26, 2013, the entire content of which is hereby incorporated by reference.

FIELD

The present disclosure relates to bead feeder, and more particularly to a machine the feeds generally spherical beads from a bulk supply to a downstream location such as the interior space of a plug-space-plug cigarette filter during filter production.

BACKGROUND

A variety of cigarette filters have been proposed over the years, and many of these filters include granular filter materials particularly in so-called plug-space-plug filter arrangements. In these filter arrangements spaced apart plugs, usually made of cellulose acetate, define a cavity or space therebetween which is filled with granulated material, such as granulated carbon as well as other materials. For example, beaded material has also been proposed for introduction into the space of a plug-space-plug filter arrangement. The actual filing of the space may be in a horizontal manner and in other instances the filling operation is vertically oriented. Also, as an alternative to a charge of granules or beads, larger beads may be fed to the space between the cellulose acetate plugs, with one bead introduced into each space or cavity.

SUMMARY

In one form, disclosed herein is a bead feeder that functions to serially delivery beads from a bulk supply to a downstream location in a highly efficient manner.

In another form, disclosed herein is a bead feeder that transports beads from a bulk supply to a space or cavity in a cigarette filter during filter production.

In yet another form, disclosed herein is a bead feeder which operates at a high speed in a simple and trouble free manner.

In one aspect, a bead feeder is provided that includes a bead supply wheel connected to rotate about a substantially vertical axis. The bead supply wheel includes a bead supply bowl that delivers beads to a plurality of radially arranged and outwardly extending transfer passageways connected to rotate with the bowl. The bowl includes a plurality of discharge openings spaced around a lower portion thereof, and each opening is in alignment with one of radially and outwardly extending passageways. The passageways guide the beads one after another in a line in a downstream direction.

The bead feeder further includes a feed plate positioned directly below the outer exit ends of the passageways for receiving a lowermost bead from the single line of beads in each passageway. The feed plate includes a plurality of pockets or openings for receiving the beads, and the feed plate is connected to rotate with the bead supply wheel at the same rotational speed.

A metering plate is positioned directly below the feed plate, and the metering plate rotates about the same vertical axis as the bead supply wheel and the feed plate. Openings in the metering plate receive beads from the pockets or openings of the feed plate. The metering plate rotates slightly slower or slightly faster than the feed plate so that alignment and transfer of beads into the openings of the metering wheel only occurs once for each opening and each revolution of the feed plate. Discharge of a bead from its respective opening in the metering plate occurs at a transfer point, along the path of travel of the metering plate.

A bead transfer wheel may be provided to receive the beads from the metering plate. The transfer wheel rotates on a horizontal axis, and spaced apart pockets on the outer circumference of the wheel receive the beads from the metering plate as they fall away at the transfer point of the metering wheel. Vacuum may be used to draw and hold the beads in the pockets of the transfer wheel until the beads are released from the wheel.

In another aspect, a moving garniture is in alignment with and directly below the bead transfer wheel. The garniture transports filter paper with equally spaced apart plugs on the paper, and the downstream location to which the beads are delivered comprises the spaces or cavities between the plugs. The bead transfer wheel functions to deliver a single bead to each such cavity. A stationary stripper adjacent the bead transfer wheel functions to assist in removal of the beads from the wheel.

BRIEF DESCRIPTION OF THE DRAWINGS

Novel features and advantages of the present invention in addition to those mentioned above will be readily apparent to persons of ordinary skill in the art from a reading of the following detailed description in conjunction with the accompanying drawings wherein similar reference characters refer to similar parts and in which.

DETAILED DESCRIPTION

Figure 1:
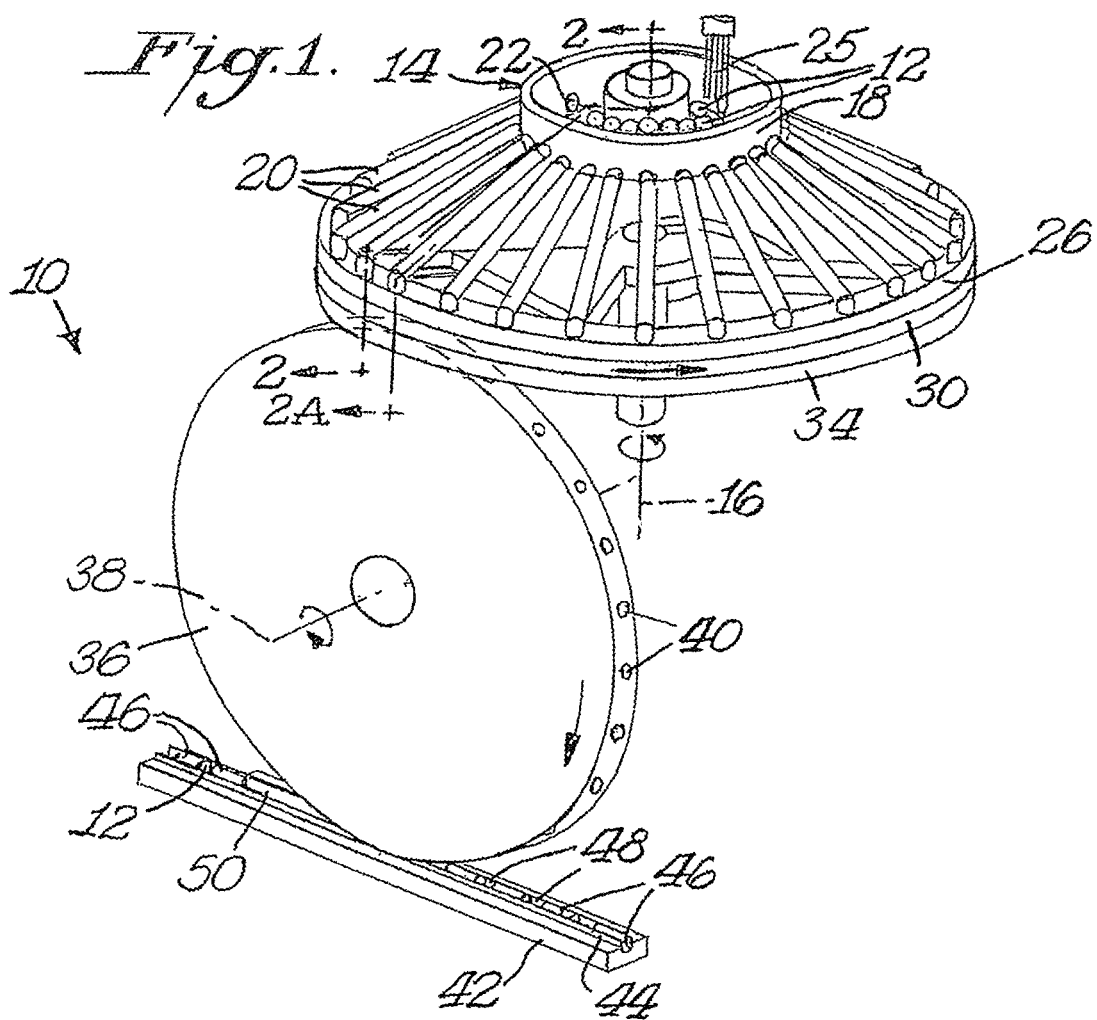
FIG. 1 is a perspective view of a bead feeder, in accordance with the present invention.
Figure 2:
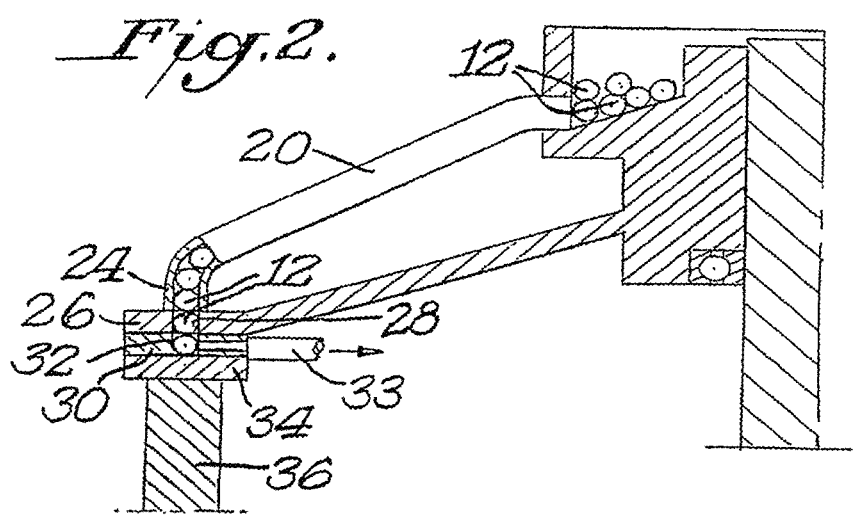
FIG. 2 is a sectional view taken along line 2-2 of FIG. 1.
Figure 2A:
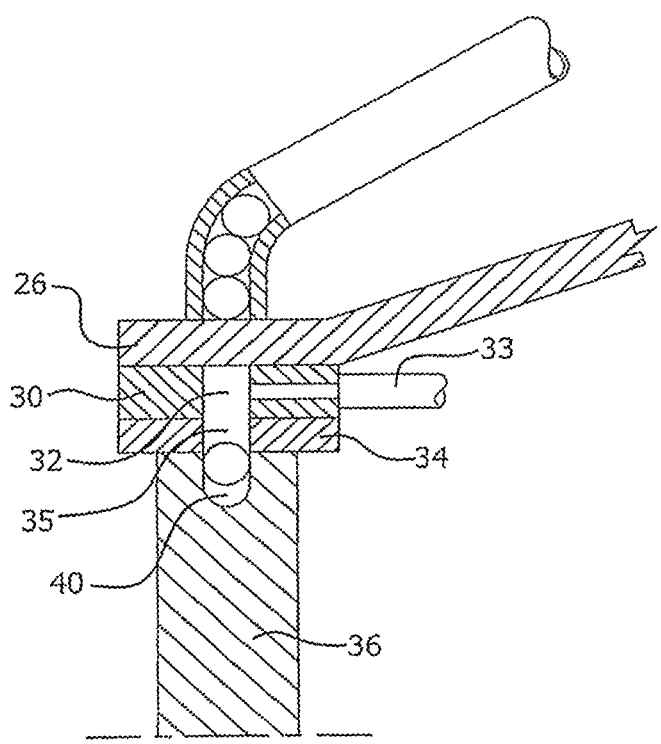
FIG. 2A is a sectional view taken along line 2A-2A of FIG. 1.

Referring in more particularity to the drawings, FIGS. 1, 2 and 2A illustrate a bead feeder 10 for serially delivering beads 12 to a downstream location. As explained more fully below such downstream location may be the space or cavity between spaced apart cellulose acetate plugs in the production of so-called plug-space-plug cigarette filters. Throughout the detailed description the term bead is utilized which is intended to include spherical configurations as well as spherically ended components.

The bead feeder 10 of the present invention comprises a bead supply wheel 14 connected to rotate about a substantially vertical axis 16. The bead supply wheel includes a bead supply bowl 18 and a plurality of radially and outwardly extended tubes or bead passageways 20 connected to rotate with the bowl 18 and dimensioned to receive a single line of beads from the bowl. A plurality of discharge openings 22 in the bead supply bowl 18 are spaced around the lower portion of the bowl with the openings 22 in alignment with the radially and outwardly passageways 20. Each of the passageways 20 has an outer exit end 24. A stationary brush 25 may be positioned within the bowl 18 to mix the beads 12.

A feed plate 26 is positioned directly below the outer exit ends 24 of the passageways 20 for receiving a lowermost bead 12 from the single line of beads in each passageway. The lowermost bead 12 in each passageway is received within pockets 28 in the feed plate, and the plate is connected to rotate with the bead supply wheel 14 at the same rotational speed.

A metering plate 30 is positioned directly below the feed plate 26, and the metering plate also rotates about the vertical axis 16. The metering plate 30 includes a plurality of openings 32 equally spaced apart in a circle directly below the pockets of the feed plate with an equal number of pockets 28 and openings 32. However, the metering plate 30 is connected to rotate at a slightly slower or slightly faster speed than the feed plate 26 so that vertical alignment of a pocket 28 with an opening 32 only occurs once during each revolution of the feed plate. That point of alignment is shown in FIG. 2 where the lowermost bead 12 in one pocket of the feed plate drops into an aligned opening 32 of the metering plate. The point of vertical alignment between a pocket 28 and opening 32 occurs about 10° to 30° before the bead is removed from the metering plate.

Each opening 32 of the metering plate is sized to receive a single bead, and vacuum 33 may be supplied to the opening to assist in the transfer from the feed plate. Otherwise the beads in the pockets of the feed plate engage the surface of the metering plate 30 between successive openings until the next alignment of the pocket 28 with an opening 32 after approximately one full rotation of the feed plate. As explained above, such alignment may occur slightly before a transfer of beads away from the metering plate 30, about 10° to 30° before the transfer point.

A stationary dead plate 34 is positioned directly below metering plate 30 and the beads already in the openings 32 of the metering plate roll along or otherwise engage the dead plate as the metering plate rotates about the vertical axis 16. The dead plate includes a drop-off 35 having dimensions sufficient to allow beads 12 to pass through the drop-off 35 in dead plate 34 at the transfer point of beads away from the metering plate through which the beads in the openings 32 drop for subsequent delivery of the beads to a downstream location. This position is shown in FIG. 2A.

In some embodiments, optional vacuum 33 is applied to the openings 32 to assist in the transfer of the beads from the feed plate 26 and to hold the beads within the openings 32. If optional vacuum 33 is applied, the vacuum is vented to atmosphere above the drop-off. In some embodiments, vacuum 33 may be eliminated since, as with the configuration shown in FIG. 2A, beads 12 drop into exterior pockets 40 on transfer wheel 36 through a single point drop-off 35 in dead plate 34 and may do so effectively without the application of vacuum 33.

The bead feeder 10 also includes a bead transfer wheel 36 below the dead plate 34 connected to rotate about a substantially horizontal axis 38. The transfer wheel 36 includes equally spaced apart exterior pockets 40 on the circumferences of the wheel for receiving beads 12 from the metering plate 30 as they fall through the drop-off in the dead plate 34. The outer surface of the transfer wheel is at the same elevation as the bottom surface of the dead plate.

Vacuum may be connected to selected pockets 40 to effect deposit of the beads into the pockets and ultimate removal from the bead transfer wheel.

In one application of the present invention a moving garniture 42 of a machine for producing cigarette filters is in alignment with and directly below the bead transfer wheel 36. The garniture 42 functions to transport filter paper 44 with equally spaced apart plugs 46 on the paper. Alternatively, the plugs 46 could be unevenly spaced apart, and in that case the delivery wheel pitch would be designed to synchronize with the cavities between the plugs. The plugs 44 may be made of cellulose acetate with appropriate binder, but other plug materials are equally acceptable depending upon the desired cigarette filter construction. The downstream location to which the beads 12 are delivered by the bead transfer wheel 36 of the bead feeder 10 comprise cavities or spaces 48 between the plugs 46. Ultimately after a bead is inserted into a cavity 48, the garniture functions to close the filter paper around the plugs and the beads, and after sealing the paper with adhesive along the longitudinal edges thereof the continuous filter composite is cut into individual plug-space-plug filters which are subsequently joined to wrapped tobacco rods.

A stationary stripper 50 may be positioned as shown in FIG. 1 adjacent the bead transfer wheel 18. The stripper is constructed and arranged to remove beads 12 from the pockets 40 of the bead transfer wheel 36. Additionally, the stripper may function to interrupt the vacuum supply to the pockets 40 to assist in removal of the beads from the pockets and discharge thereof into the cavities 48. A single bead is delivered to each of the cavities.

Any suitable drive mechanism may be utilized to rotate the bead supply wheel 13 and the bead transfer wheel 36. Also, the drive mechanism functions to rotate the metering plate at a slightly faster or slower speed than the bead supply wheel 14, for the reasons discussed above.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A bead feeder comprising:
 a metering plate configured to receive a plurality of beads, the metering plate defining a plurality of equally spaced apart through-holes, each of the plurality of equally spaced apart through-holes being configured to receive one of the plurality of beads;
 a stationary dead plate defining a single cylindrical aperture therethrough, the stationary dead plate having a consistent thickness throughout, the single cylindrical aperture being a single transfer point for beads away from the metering plate, the single cylindrical aperture configured to transfer a single bead from one of the plurality of equally spaced apart through-holes when the single cylindrical aperture is aligned with the one of the plurality of equally spaced apart through-holes, a diameter of the single cylindrical aperture being equal to a diameter of one of the plurality of equally spaced apart through-holes; and a transfer wheel configured to receive the single bead from the stationary dead plate.

2. The bead feeder of claim 1, further comprising:
a bead supply configured to rotate about a first axis; and wherein
the metering plate is configured to receive the plurality of beads from the bead supply, and
the transfer wheel is configured to rotate about a second axis, the second axis being orthogonal to the first axis.

3. The bead feeder of claim 2, wherein the first axis is a vertical axis and the second axis is a horizontal axis.

4. The bead feeder of claim 2, wherein
the metering plate is ring-shaped, and
the metering plate is configured to rotate about the first axis, such that the metering plate is aligned with the bead supply.

5. The bead feeder of claim 4, wherein the bead supply comprises:
a plurality of passageways extending radially from a supply bowl, the plurality of passageways configured to transport the plurality of beads from the supply bowl to the metering plate.

6. The bead feeder of claim 5, wherein
the metering plate is configured to rotate at a speed different from the bead supply such that vertical alignment of each of the plurality of equally spaced apart through-holes with an exit of each of the plurality of passageways occurs only once during each revolution of the bead supply.

7. The bead feeder of claim 5, further comprising:
a feed plate between the metering plate and the bead supply, the feed plate configured to rotate with the bead supply about the first axis.

8. The bead feeder of claim 7, wherein
the feed plate defines a plurality of pockets, each of the plurality of pockets aligning with a respective one of the plurality of passageways in the bead supply, each of the plurality of pockets configured to receive a respective one of the plurality of beads from the respective one of the plurality of passageways, and
once during each revolution of the bead supply, each of the plurality of equally spaced apart through-holes in the metering plate aligns with a respective one of the plurality of pockets in the feed plate.

9. The bead feeder of claim 7, wherein
the feed plate and supply bowl are a single, monolithic piece.

10. The bead feeder of claim 2, further comprising:
a vacuum source in fluid communication with the plurality of equally spaced apart through-holes in the metering plate.

11. The bead feeder of claim 1, further comprising:
a conveyor in alignment with the transfer wheel, the conveyor configured to serially receive the plurality of beads from the transfer wheel, the conveyor configured to transport the plurality of beads.

12. A method for serially delivering a plurality of beads to a downstream location, the method comprising:

transferring a plurality of beads from a bead supply to a metering plate, the metering plate including a plurality of equally spaced apart through-holes, each of the plurality of equally spaced apart through-holes being configured to receive one of the plurality of beads from the bead supply; and serially transferring each of the plurality of beads from each of the plurality of equally spaced apart through-holes from a single cylindrical aperture defined in a stationary dead plate to a transfer wheel, the stationary dead plate having a uniform thickness throughout, a diameter of the single cylindrical aperture being equal to a diameter of one of the plurality of equally spaced apart through-holes; and serially delivering the plurality of beads from the transfer wheel.

13. The method of claim 12, further comprising:
rotating the bead supply about a first axis; and
rotating the transfer wheel about a second axis, the second axis being orthogonal to the first axis.

14. The method of claim 13, further comprising:
rotating the metering plate about the first axis such that the metering plate is aligned with the bead supply, the metering plate being ring-shaped.

15. The method of claim 14, wherein the serially transferring comprises:
transporting the plurality of beads from a supply bowl of the bead supply to the metering plate through a plurality of passageways radially extending from the supply bowl, the plurality of passageways rotating with the supply bowl and the bead supply.

16. The method of claim 15, wherein the transferring a plurality of beads from the bead supply to a metering plate comprises:
rotating the metering plate at a speed different from a speed of the bead supply such that vertical alignment of each of the plurality of equally spaced apart through-holes with an exit of each of the plurality of passageways occurs only once during each revolution of the bead supply.

17. The method of claim 16, further comprising:
rotating a feed plate between the metering plate and the bead supply about the first axis.

18. The method of claim 17, wherein the transferring a plurality of beads from the bead supply to a metering plate comprises:
transferring the plurality of beads through a plurality of pockets in the feed plate, each of the plurality of pockets aligning with a respective one of the plurality of passageways in the bead supply, and each of the plurality of pockets receiving a respective one of the plurality of beads from the respective one of the plurality of passageways.

19. The method of claim 12, further comprising:
serially transferring the plurality of beads from the transfer wheel to a conveyor in alignment with the transfer wheel; and
transporting, by the conveyor, the plurality of beads to the downstream location.

20. The method of claim 12, wherein the transferring comprises:
applying a vacuum to each of the plurality of equally spaced apart through-holes in the metering plate.

* * * * *